3,326,707
PLASTICIZER COMPOSITIONS STABILIZED WITH
A TERTIARY-BUTYL CATECHOL
Francis C. Huber, Moorestown, N.J., assignor to Allied
Chemical Corporation, New York, N.Y., a corporation
of New York
No Drawing. Filed July 30, 1964, Ser. No. 386,384
2 Claims. (Cl. 106—316)

This invention relates to stabilized plasticizer compositions, and resin compositions plasticized therewith.

A variety of plasticizers are used with a great variety of polymer resins. The plasticizers are esters used straight or mixed with each other, and are incorporated into the polymer resin usually by kneading the plasticizer into the polymer at an elevated temperature at which the polymer is suitably soft to permit the incorporation of the ester thereinto. The plasticized polymer is subsequently subjected to a molding treatment at temperatures generally in excess of 100° C. In the case of plastisols, generally the fine particulate polymer is suspended in the liquid plasticizer and the suspension is then molded by techniques known for shaping objects from plastisols, during which time the plastisol is usually subjected to temperatures in the excess of 100° C. to fuse or gel the polymer into a contiguous mass.

It was observed that plasticizers when exposed to temperatures in the excess of 100° C., such as during the incorporation of the plasticizer into the polymer, or during the forming of the plasticized polymer composition, the plasticizer decomposed and decomposition products had an objectionable odor. It was determined that certain polar contaminants, mostly organic polar sulfur compounds which were used previously to promote the esterification of the plasticizers, catalyze the decomposition of the esters when they are exposed to temperatures in the excess of 100° C. Although a variety of adsorbents have been suggested for removing such polar contaminants, even after an adsorption treatment the esters contain sufficient amounts of polar contaminants to create an objectionable odor.

In accordance with the present invention, it was found that the odor caused by the decomposition of plasticizers which were previously treated to remove the bulk of polar contaminants therefrom, can be inhibited by incorporating thereinto a stabilizing amount of a tertiary-butyl catechol.

The plasticizers useful for carrying out the present invention are preferably alkyl and cycloalkyl esters wherein the alkyl or cycloalkyl group contains between 4 and 13 carbon atoms. The esters can typically be esters of polycarboxylic acids with monofunctional alcohols, esters of monocarboxylic acids with polyols, and esters of polycarboxylic acids with polyols. These typical groups of esters which, after pre-treatment to remove the bulk of polar organic compounds, can be stabilized in accordance with the invention, include, for example:

Adipates:
    Di-2-ethylhexyl adipate,
    Di-n-hexyl adipate,
    Di-n-octyl adipate,
    Di-n-decyl adipate,
    Diisodecyl adipate.
Phthalates:
    Di-n-octyl phthalte,
    Di-n-hexyl phthalate,
    Di-n-decyl phthalte,
    Dicyclohexyl phthalate,
    Diisodecyl phthalte,
    Butyl cyclohexyl phthalate,
    Butyl isodecyl phthalate,
    Bis-(2-ethylhexyl) phthalate,
    Diisooctyl phthalate,
    Isooctyl isodecyl phthalate,
    Di-tridecyl phthalate,
    Dibutyl phthalate,
    Dimethyl phthalate.
Sebacates:
    Ethylhexylsebacate,
    Di-isodecyl sebacate.
Stearates:
    Diethylene glycol distearate.
Oleates:
    Diethylene glycol dioleate.
Diol succinates:
    Butanediol succinate.
Glycol adipates:
    Ethylene glycol adipate,
    Propylene glycol adipate.
Glycol maleates:
    Propylene glycol maleate.
Glycol phthalates:
    Ethylene glycol phthalate.

The present invention is also applicable in cases where, in a known manner, mixtures of the same type of esters with different number of carbon atoms in the alkyl or cycloalkyl group, and of different types of esters are used.

Polymeric resins plasticizable with the plasticizers of the present invention include, for example, vinyl resins such as polyvinyl chloride, polystyrene, cellulose acetate, cellulose nitrate, butyrate resins, both mono and copolymers, both molding compositions and plastisols.

Effective stabilization against odor development can be accomplished by as little as 0.01% stabilizer based on the weight of the plasticizer, with 0.05% stabilizer, based on weight of the plasticizer, being preferred.

It is not known whether the use of larger amounts of stabilizer would permit the elimination of the absorptive pre-treatment of the esters; however, it was found that when the esters are pre-treated with an absorptive preparation to remove the organic polar contaminants therefrom, as described in greater detail in the following, no benefit is derived from using amounts of stabilizer in the excess of 0.1% by weight based on the ester.

The polar contaminants, most generally sulfur compounds, can be most conveniently removed by treatment with a solid adsorbent, such as synthetic hydrous magnesium silicate, known under the trade name Magnesol. The amount of the polar, odor-causing contaminants left in the esters after treatment with Magnesol, have not been determined; however, any adsorbent which exhibits an activity substantially similar to that of Magnesol, is adequate for carrying out the present invention.

In the following, examples are presented which set forth the best method contemplated for carrying out the invention, but the invention is not limited to all details of the examples.

*Example 1*

In this example, prior to adding the stabilizer of the invention, the odor-causing polar contaminants, unless otherwise indicated, were removed by a Magnesol treatment. About 0.25 to 0.5% by weight, based on the amount of plasticizer, of Magnesol was used. The adsorbent was slurried into the plasticizer and subsequently was filtered off. The results of the example are given in the following table. Listed under the example in the table, and designated by letters are several controls for comparison purposes. Percentages are by weight, and temperatures in ° C. Odor formation was evaluated subjectively. A di-2-ethylhexyl adipate plasticizer was used.

| Example | Stabilizer additive | Percent stabilizer | Temp. (deg.) | Hrs. Exposure | Result |
|---|---|---|---|---|---|
| 1 | p-t-Butyl catechol | 0.05 | 150 | 1 | No odor. |
| a | None | | 175 | 0.5 | Slight odor. |
| b | ----do---- | | 175 | 1 | Odor, color. |
| c | ----do---- | | 175 | 2 | Strong odor, color. |
| d | Tris(nonylphenyl)phosphite | 0.01 | 175 | 1 | Odor. |
| e | 2,6-di-t-butyl-4-methylphenol | 0.05 | 150 | 1 | Do. |

*Example 2*

100 parts by weight polyvinyl chloride plastisol is slurried in 20 parts by weight of the plasticizer of Example 1. The resulting mixture is centrifugally molded, under heat, into a hollow playing ball. The ball is cut open and the interior is free of odor. A similarly prepared ball, but wherein the plasticizer does not contain the stabilizer, manifests considerable odor.

I claim:
1. A plasticizer composition comprising di-2-ethylhexyl adipate and between about 0.01% and about 0.1% by weight of p-t-butyl catechol based on the di-2-ethylhexyl adipate.
2. The plasticizer composition of claim 1 comprising di-2-ethylhexyl adipate prepared in the presence of an organic polar sulfur compound and thereafter treated to be substantially free of polar organic contaminants, and between about 0.01% and about 0.1% by weight of p-t-butyl catechol based on said di-2-ethylhexyl adipate.

References Cited

UNITED STATES PATENTS

| 2,604,458 | 7/1952 | Havens | 260—29.1 |
| 2,675,366 | 4/1954 | Pullman | 260—45.95 |
| 2,748,159 | 5/1956 | Finelli | 260—475 |
| 2,862,958 | 12/1958 | Goreau | 260—475 |
| 2,919,259 | 12/1959 | Naylor et al. | 260—45.95 |
| 3,091,597 | 5/1963 | Henriques | 260—45.95 |
| 3,124,555 | 3/1964 | Bown et al. | 260—45.95 |

FOREIGN PATENTS 1,149,348  5/1963  Germany.

MORRIS LIEBMAN, *Primary Examiner.*

L. T. JACOBS, *Assistant Examiner.*